United States Patent
Chen et al.

(10) Patent No.: US 7,920,366 B2
(45) Date of Patent: *Apr. 5, 2011

(54) ESD CONFIGURATION FOR LOW PARASITIC CAPACITANCE I/O

(75) Inventors: Chun-Ying Chen, Irvine, CA (US); Agnes Neves Woo, Encino, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/393,417

(22) Filed: Feb. 26, 2009

(65) Prior Publication Data

US 2009/0161276 A1   Jun. 25, 2009

Related U.S. Application Data

(63) Continuation of application No. 11/174,731, filed on Jul. 6, 2005, now Pat. No. 7,505,238.

(60) Provisional application No. 60/641,777, filed on Jan. 7, 2005.

(51) Int. Cl.
H02H 9/00 (2006.01)
(52) U.S. Cl. .......................... 361/56; 361/91.1; 361/111
(58) Field of Classification Search .................... 361/56, 361/91.1, 111
See application file for complete search history.

(56) References Cited

U.S. PATENT DOCUMENTS

| | | | |
|---|---|---|---|
| 3,787,717 A | 1/1974 | Fischer et al. |
| 4,151,425 A | 4/1979 | Cappa |
| 4,385,337 A | 5/1983 | Asano et al. |
| 4,417,162 A | 11/1983 | Keller et al. |
| 4,423,431 A | 12/1983 | Sasaki |
| 4,593,349 A | 6/1986 | Chase et al. |
| 4,674,031 A | 6/1987 | Siska, Jr. |
| 4,763,184 A | 8/1988 | Krieger et al. |
| 4,789,976 A | 12/1988 | Fujishima |
| 4,818,903 A | 4/1989 | Kawano |
| 4,903,329 A | 2/1990 | Marik et al. |
| 5,031,233 A | 7/1991 | Ragan |
| 5,079,612 A | 1/1992 | Takamoto et al. |
| 5,162,888 A | 11/1992 | Co et al. |
| 5,180,965 A | 1/1993 | Nose |

(Continued)

FOREIGN PATENT DOCUMENTS

DE 3723778 A1 1/1988

(Continued)

OTHER PUBLICATIONS

Kwon, K. et al., "A Novel ESD Protection Technique for Submicron CMOS/BiCMOS Technologies," EOS/ESD Symposium 95-21, pp. 1.3.1-1.3.6 (1995).
International Search Report for Appln. No. PCT/US00/17952, mailed Oct. 19, 2000, 4 pages.
Dallas Semiconductor, Data Sheet For DS1802, Dual Audio Taper Potentiometer With Pushbutton Control, pp. 1-17.
Dallas Semiconductor, Data Sheet for DS1801, Dual Audio Taper Potentiometer, pp. 1-10.

(Continued)

*Primary Examiner* — Jared J Fureman
*Assistant Examiner* — Christopher J Clark
(74) *Attorney, Agent, or Firm* — Sterne, Kessler, Goldstein & Fox P.L.L.C.

(57) ABSTRACT

An integrated circuit can include an I/O pad, an internal circuit, an inductor, an electrostatic discharge (ESD) protection circuit, and an ESD clamp. The internal circuit can be biased with a first voltage supply and a second voltage supply, where the internal circuit is connected to the I/O pad at a first node. The ESD protection circuit can be connected between the first node and a second node. The inductor can be connected between the second node and a third voltage supply. Further, the ESD clamp can be connected between the second node and the second voltage supply.

20 Claims, 10 Drawing Sheets

U.S. PATENT DOCUMENTS

| | | | |
|---|---|---|---|
| 5,237,395 | A | 8/1993 | Lee |
| 5,239,440 | A | 8/1993 | Merrill |
| 5,290,724 | A | 3/1994 | Leach |
| 5,329,143 | A | 7/1994 | Chan et al. |
| 5,428,829 | A | 6/1995 | Osburn et al. |
| 5,430,595 | A | 7/1995 | Wagner et al. |
| 5,446,302 | A | 8/1995 | Beigel et al. |
| 5,530,612 | A | 6/1996 | Maloney |
| 5,560,022 | A | 9/1996 | Dunstan et al. |
| 5,574,618 | A | 11/1996 | Croft |
| 5,610,790 | A | 3/1997 | Staab et al. |
| 5,616,943 | A | 4/1997 | Nguyen et al. |
| 5,633,825 | A | 5/1997 | Sakuta et al. |
| 5,654,862 | A | 8/1997 | Worley et al. |
| 5,739,587 | A | 4/1998 | Sato |
| 5,751,507 | A | 5/1998 | Watt et al. |
| 5,752,046 | A | 5/1998 | Oprescu et al. |
| 5,825,600 | A | 10/1998 | Watt |
| 5,828,589 | A | 10/1998 | Degenhardt |
| 5,872,379 | A | 2/1999 | Lee |
| 5,903,419 | A | 5/1999 | Smith |
| 5,917,220 | A | 6/1999 | Waggoner |
| 5,917,336 | A | 6/1999 | Smith et al. |
| 6,011,420 | A | 1/2000 | Watt et al. |
| 6,014,039 | A | 1/2000 | Kothandaraman et al. |
| 6,034,400 | A | 3/2000 | Waggoner et al. |
| 6,046,897 | A | 4/2000 | Smith et al. |
| 6,078,068 | A | 6/2000 | Tamura |
| 6,144,542 | A | 11/2000 | Ker et al. |
| 6,237,103 | B1 | 5/2001 | Lam et al. |
| 6,246,262 | B1 | 6/2001 | Morgan |
| 6,317,305 | B1 | 11/2001 | Dedic |
| 6,345,362 | B1 | 2/2002 | Bertin et al. |
| 6,437,955 | B1 | 8/2002 | Duffy et al. |
| 6,509,779 | B2 | 1/2003 | Yue et al. |
| 6,587,321 | B2 | 7/2003 | Woo |
| 6,593,794 | B2 | 7/2003 | Yue et al. |
| 6,597,227 | B1 | 7/2003 | Yue et al. |
| 6,624,999 | B1 | 9/2003 | Johnson |
| 6,639,771 | B2 | 10/2003 | Li |
| 6,671,816 | B1 | 12/2003 | Woo |
| 6,862,161 | B2 | 3/2005 | Woo |
| 6,885,534 | B2 | 4/2005 | Ker et al. |
| 6,963,110 | B2 | 11/2005 | Woo et al. |
| 7,013,402 | B2 | 3/2006 | Woo |
| 7,154,150 | B2 | 12/2006 | Hu et al. |
| 2006/0125015 | A1 | 6/2006 | Woo |
| 2006/0152870 | A1 | 7/2006 | Chen et al. |

FOREIGN PATENT DOCUMENTS

| | | |
|---|---|---|
| DE | 195 06 324 C1 | 10/1995 |
| EP | 0 393 717 A2 | 10/1990 |
| EP | 0 431 887 A2 | 6/1991 |
| EP | 0 505 158 A2 | 9/1992 |
| EP | 0 535 536 A2 | 4/1993 |
| EP | 0 663 727 A1 | 7/1995 |
| GB | 2 319 893 A | 6/1998 |
| WO | WO 97/09786 A1 | 3/1997 |
| WO | WO 00/21134 A1 | 4/2000 |

OTHER PUBLICATIONS

Narita et al., "A Novel On-Chip Electrostatic Discharge (ESD) Protection With Common Discharge Line for High-Speed CMOS LSI's", IEEE Transactions on Electron Devices, vol. 44, No. 7, pp. 1124-1130, Jul. 7, 1997.

Ker et al., "ESD Protection to Overcome Internal Gate-Oxide Damage on Digital-Analog Interface of Mixed-Mode CMOS IC's", Proc. 7th Europ. Symp. Reliability of Electron Devices, Failure Physics and Analysis., vol. 36, No. 11/12, pp. 1727-1730, 1996.

Narita et al., "A Novel On-Chip Electrostatic Discharge (ESD) Protection for Beyond 500 MHz DRAM", IEDM Tech. Dig., pp. 539-542, 1995.

Ker et al., "ESD Buses for Whole-Chip ESD Protection", Proc. Of IEEE International Symposium on Circuits and Systems, Orlando, Florida, pp. 545-548, May 30-Jun. 2, 1999.

Ker et al., "Whole-Chip ESD Protection Design for Submicron CMOS VLSI", IEEE International Symposium on Circuits and Systems, Jun. 9-12, 1997, Hong Kong, pp. 1920-1923.

Ker et al., "Whole-Chip ESD Protection Scheme for CMOS Mixed-Mode IC's in Deep-Submicron CMOS Technology", Proc. Of IEEE Custom Integrated Circuits Conference (CICC), Santa Clara, CA, May 5-8, 1997, pp. 31-34.

Ker et al., "Whole-Chip ESD Protection for CMOS VLSI/ULSI With Multiple Power Pins", 94 IRW Final Report, pp. 124-128, 1994.

Ker et al., "Whole-Chip ESD Protection Strategy for CMOS IC's With Multiple Mixed-Voltage Power Pins", Proc. of 1999 International Symposium on VLSI Technology, System, and Application, Taipei, Taiwan, Jun. 8-10, 1999, pp. 298-301.

Ker, Ming-Dou, "Whole-Chip ESD Protection Design With Efficient VDD-to-VSS ESD Clamp Circuits for Submicron CMOS VLSI", IEEE Transaction on Electron Devices, vol. 46, No. 1, pp. 173-183, Jan. 1999.

Photograph of Dallas Semiconductor DS1801, Dual Audio Taper Potentiometer (1 page).

Photograph of Dallas Semiconductor DS1802, Dual Audio Taper Potentiometer With Pushbutton Control (4 pages).

Ming-Dou Ker, "Tutorial to Design of ESD/Latchup Protection in Submicron CMOS IC's", VLSI Design Division, Computer & Communication Research Laboratories, Taiwan, Jul. 1997 (111 pages).

Thomas Polgreen, "Tutorial H, Selecting and Implementing the Appropriate ESD Protection Strategy", Electrostatic Discharge Association, Rome, NY, Oct. 5, 1998 (47 pages).

Thomas Polgreen, Tutorial I, Selecting and Implementing the Appropriate ESD Protection Strategy, Electrostatic Discharge Association, Rome, NY, Sep. 22, 1997 (40 pages).

Poole et al., "A CMOS Subscriber Line Audio Processing Circuit Including Adaptive Balance," IEEE Proceedings of the International Symposium on Circuits and Systems, US, New York, vol. Conf. 21, 1988, pp. 1931-1934.

N. Weste et al., Principles of CMOS VLSI Design, Addison-Wesley Publishing Co., 1985, pp. 86-87.

International Preliminary Examining Report for International Application No. PCT/US00/00999, mailed Mar. 30, 2001.

Invitation to Pay Additional Fees and attached Partial Search Report, dated May 24, 2000, relating to International Appl. No. PCT/US99/26700.

International Search Report, dated Jul. 18, 2000, for International Appl. No. PCT/US00/00999.

"Special Master's Report and Recommendation on Claim Construction, Part One: The '039, '366, '412 and '712 Patents", *STmicroelectronics, Inc.*, Plaintiff v. *Broadcom Corporation*, Defendant, Civil Action No. 4:02-CV-362, The U.S. District Court for The Eastern District of Texas, Sherman Division, Dec. 31, 2003.

"Initial Determination, Administrative Law Judge Sidney Harris", In the matter of: Certain Power Amplifier Chips Broadband Tuner Chips, Transceiver Chips, and Products Containing Same, Investigation No. 337-TA-490, U.S. International Trade Commission, Washington, DC, Aug. 17, 2004.

Duvvury et al., "ESD Protection: Design and Layout Issues for VLSI Circuits," IEEE Transactions on Industry Application, vol. 25 No. 1, Jan./Feb. 1989, pp. 41-47.

Keller, J. K., "Protection of MOS Integrated Circuits from Destruction by Electrostatic Discharge," IIT Research Institute, 1981, pp. 73-80.

Hulett, T.V., "On Chip Protection of High Density NMOS Devices," pp. 90-96.

Protective Device, at http://www.delphion.com/tdbs/tdb?&order=85A+61057, IBM Technical Disclosure Bulletin, Apr. 1985, pp. 6814-6815.

Galal, S. and Razavi, B., "Broadband ESD Protection circuits in CMOS Technology," IEEE Journal of Solid-State Circuits, vol. 38, No. 12, pp. 2334-2340 (Dec. 2003).

Ker, M. and Lin, K., "Desing on ESD Protection Scheme for IC With Power-Down-Mode Operation," IEEE Journal of Solid-State Circuits, vol. 39, No. 8, pp. 1378-1382 (Aug. 2004).

ESD CONFIGURATION FOR LOW PARASITIC CAPACITANCE I/O

CROSS REFERENCE TO RELATED APPLICATIONS

This application is a continuation application of pending U.S. application entitled "ESD Configuration for Low Parasitic Capacitance I/O," Ser. No. 11/174,731, filed Jul. 6, 2005, which claims the benefit of U.S. provisional patent application entitled "ESD Configuration for Low Parasitic Capacitance I/O," Ser. No. 60/641,777, filed Jan. 7, 2005, which are both incorporated herein by reference in their entireties.

BACKGROUND

1. Field

The present invention generally relates to input-output (I/O) electrostatic discharge (ESD) protection of integrated circuits. More specifically, the present invention is directed to an I/O ESD configuration with reduced parasitic loading on the I/O pad of an integrated circuit.

2. Background

Conventional integrated circuits typically require high quality I/O signal performance. The quality of an I/O signal is degraded by parasitic loading on the I/O pins, or pads, of an integrated circuit. The parasitic loading on the I/O pins is largely caused by the wire bonding structures and ESD protection structures that are included on each I/O port for manufacturability. The bonding structures and ESD protection structures introduce parasitic capacitances that can adversely affect I/O signal bandwidth. The I/O signal bandwidth supported by an I/O pin is reduced as the parasitic capacitance appearing at the I/O pin increases.

The parasitic capacitance of ESD protection structures is often non-linear. Therefore, the parasitic capacitance appearing at the I/O pin changes in a non-linear manner as the I/O signal changes. The result is a parasitic loading effect on the I/O pin that is I/O signal dependent, which causes I/O signal distortion or non-linearity. It is therefore desirable to minimize the parasitic capacitance of ESD protection structures to accommodate high quality I/O signal performance at the I/O port of the integrated circuit.

I/O ESD protection is often sacrificed to minimize the parasitic capacitance appearing at sensitive I/O pins. The ESD tolerance of an integrated circuit, however, is an important feature of integrated circuit manufacturing. Poor ESD tolerance can adversely affect product yield and reliability, particularly in high volume products or in products that may be exposed to handling. Therefore, it is essential to achieve an acceptable level of ESD protection, even in integrated circuits having high performance I/O ports.

SUMMARY

Accordingly, embodiments of the present invention provide high quality I/O signal performance without sacrificing ESD protection by substantially obviating one or more of the disadvantages of the related art.

Embodiments of the present invention include an integrated circuit with an I/O pad, an internal circuit, an electrostatic discharge (ESD) protection circuit, and an inductor. The internal circuit can be biased with a first voltage supply and a second voltage supply, where the internal circuit is connected to the I/O pad at a first node. The ESD protection circuit can be connected between the first node and a second node. The inductor can be connected between the second node and a third voltage supply. Further, the integrated circuit can also include an ESD clamp connected between the second node and a third voltage supply.

Embodiments of the present invention additionally include a method for protecting an integrated circuit from ESD. The integrated circuit can be coupled to a first voltage supply, a second voltage supply, and an I/O pad. The method includes the following: reverse biasing an ESD protection circuit that is connected to the I/O pad and the integrated circuit at a first node and coupled to a third voltage supply through an inductor; discharging an ESD current present on the I/O pad through the ESD protection circuit; and, transferring the ESD current from the ESD protection circuit to an ESD clamp, where the ESD clamp transfers the ESD current away from the third voltage supply.

Additional features and advantages of the invention will be set forth in the description that follows, and in part will be apparent from the description, or may be learned by practice of the invention. The advantages of the invention will be realized and attained by the structure and particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS/FIGURES

The accompanying drawings illustrate the present invention and, together with the description, further serve to explain the principles of the invention and to enable one skilled in the pertinent art to make and use the invention.

DETAILED DESCRIPTION

Figure 1:
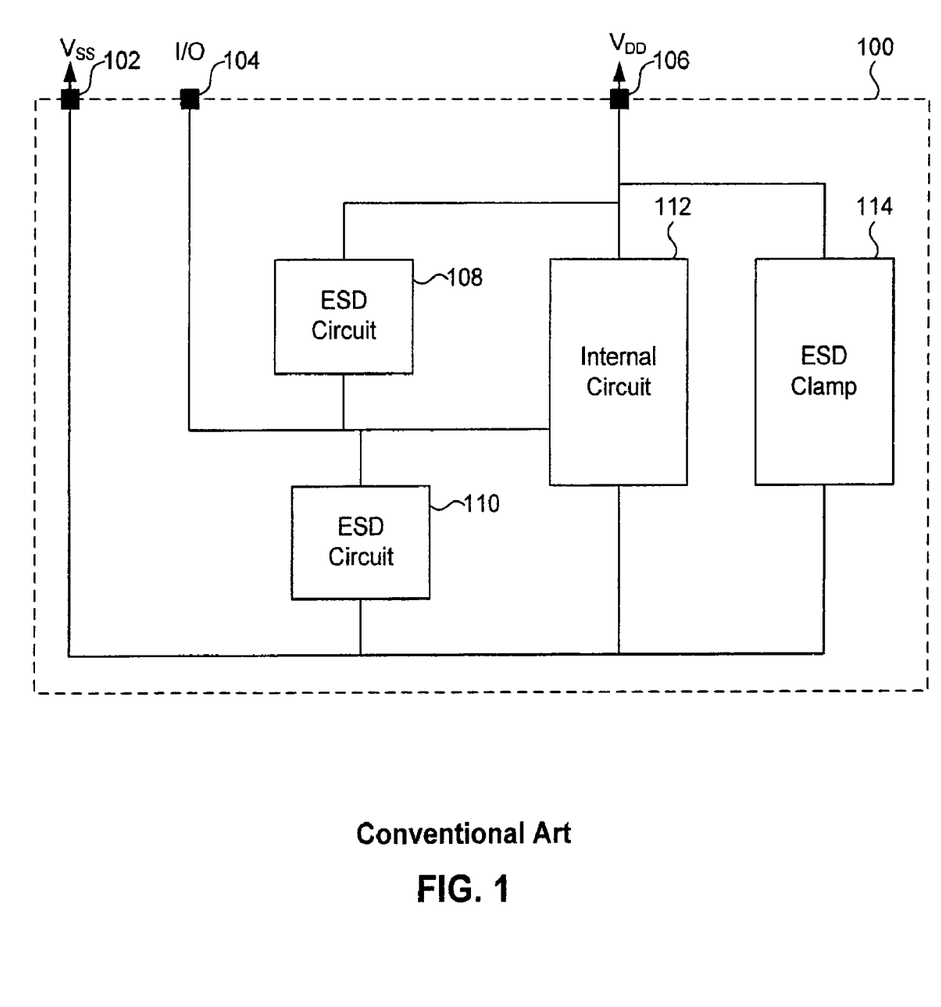
FIG. 1 illustrates an exemplary integrated circuit with conventional I/O ESD protection.

FIG. 1 illustrates an exemplary integrated circuit 100 with conventional input-output (I/O) electrostatic discharge (ESD) pulse protection. The integrated circuit 100 includes an internal circuit 112. The internal circuit 112 is connected between a supply voltage $V_{DD}$ and a supply voltage $V_{SS}$ at a $V_{DD}$ bond pad 106 and a $V_{SS}$ bond pad 102, respectively. The supply voltage $V_{DD}$ is typically a relatively high supply voltage compared to the supply voltage $V_{SS}$. For example, the supply voltage $V_{DD}$ could be a positive supply voltage while the supply voltage $V_{SS}$ could be a ground or a negative supply voltage. In the following description, $V_{SS}$ is assumed to be a ground. The present invention can support other $V_{SS}$ supply voltages and is not limited to $V_{SS}$ being a ground, as will be understood by those skilled in the relevant arts, based on the discussion given herein.

The internal circuit 112 is connected to an I/O bond pad 104. Output signals are passed to the I/O pad 104 from the internal circuit 112 and input signals are passed from the I/O pad 104 to the internal circuit 112. These I/O signals are typically high frequency signals. In many applications, for example, it is desirable to design the I/O pad to be capable of supporting input signals ranging from 0 Hz to approximately 1 GHz. However, the invention is not limited to this frequency range.

An ESD clamp 114 is connected in parallel to the internal circuit 112 between the supply voltage $V_{DD}$ and the supply voltage $V_{SS}$. The ESD clamp 114 protects the internal circuit 112 from ESD pulses appearing at the $V_{DD}$ pad 106. The ESD clamp 114 can be configured as a conventional ESD clamp. An ESD pulse appearing at the $V_{DD}$ pad 106 can be shunted or discharged to the $V_{SS}$ pad 102 to prevent the ESD pulse from damaging the internal circuit 112. The ESD clamp 114 therefore provides supply voltage ESD pulse protection to the internal circuit 112.

As further shown in FIG. 1, the integrated circuit 100 includes an ESD protection circuit 108. The ESD protection circuit 108 is connected between the I/O pad 104 and the $V_{DD}$ pad 106. The ESD protection circuit 108 is activated during a positive ESD event. A positive ESD event is characterized by a spurious positive ESD pulse appearing at the I/O pad 104. The ESD protection circuit 108 provides a low impedance path to the ESD clamp 114 during a positive ESD event. The ESD protection circuit 108 can shunt an ESD discharge current to the ESD clamp 114, and then on to $V_{SS}$, during a positive ESD event. In this way, the ESD protection circuit 108 can provide protection to the internal circuit 112 from positive ESD discharges appearing at the I/O pad 104.

The integrated circuit 100 also includes an ESD protection circuit 110. The ESD protection circuit 110 is connected between the I/O pad 104 and the $V_{SS}$ pad 102. The ESD protection circuit 110 is activated during a negative ESD event. A negative ESD event is characterized by a spurious negative ESD pulse appearing at the I/O pad 104. The ESD protection circuit 110 provides a low impedance path to the $V_{SS}$ pad 102 during a negative ESD event. The ESD protection circuit 110 can shunt an ESD discharge current to $V_{SS}$ during a negative ESD event. In this way, the ESD protection circuit 110 can provide protection to the internal circuit 112 from negative ESD discharges appearing at the I/O pad 104.

Together, the ESD protection circuit 108 and the ESD protection circuit 110 provide I/O ESD pulse protection to the integrated circuit 100 having a single I/O port. Positive and negative ESD events can contain both low and high frequency content, since the edge rate of an ESD discharge can be in the GHz range.

Figure 2:
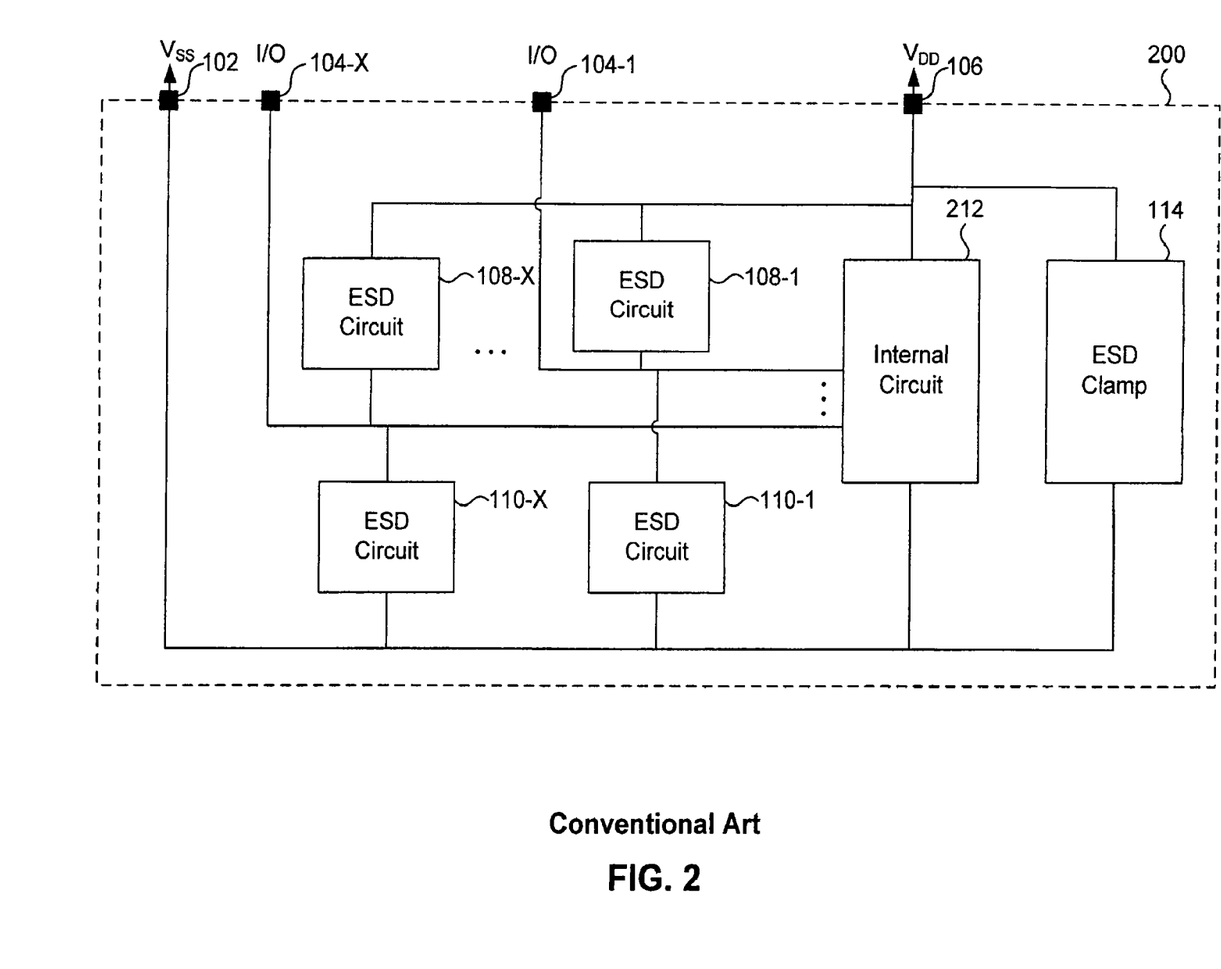
FIG. 2 illustrates an exemplary integrated circuit with conventional I/O ESD protection on multiple I/O ports.

The conventional I/O ESD protection configuration depicted in FIG. 1 can be expanded to support multiple I/O ports of an integrated circuit. FIG. 2 illustrates an exemplary integrated circuit 200 with multiple I/O ports, each with conventional I/O ESD protection. The integrated circuit 200 includes a number of I/O pads 104-1 through 104-X connected to an internal circuit 212. The internal circuit 212 is designed to support multiple I/O signals. The integrated circuit 200 includes a number of ESD protection circuits 108-1 through 108-X and a number of ESD protection circuits 110-1 through 110-X. The ESD protection circuits 108-1 through 108-X protect the internal circuit 212 from positive ESD discharges appearing at the corresponding I/O pads 104-1 through 104-X. The ESD protection circuits 110-1 through 110-X protect the internal circuit 212 from negative ESD discharges appearing at the corresponding I/O pads 104-1 through 104-X. Together, the ESD protection circuits 108-1 through 108-X and the ESD protection circuits 110-1 through 110-X provide I/O ESD pulse protection to the integrated circuit 200 having multiple I/O ports.

Figure 3:
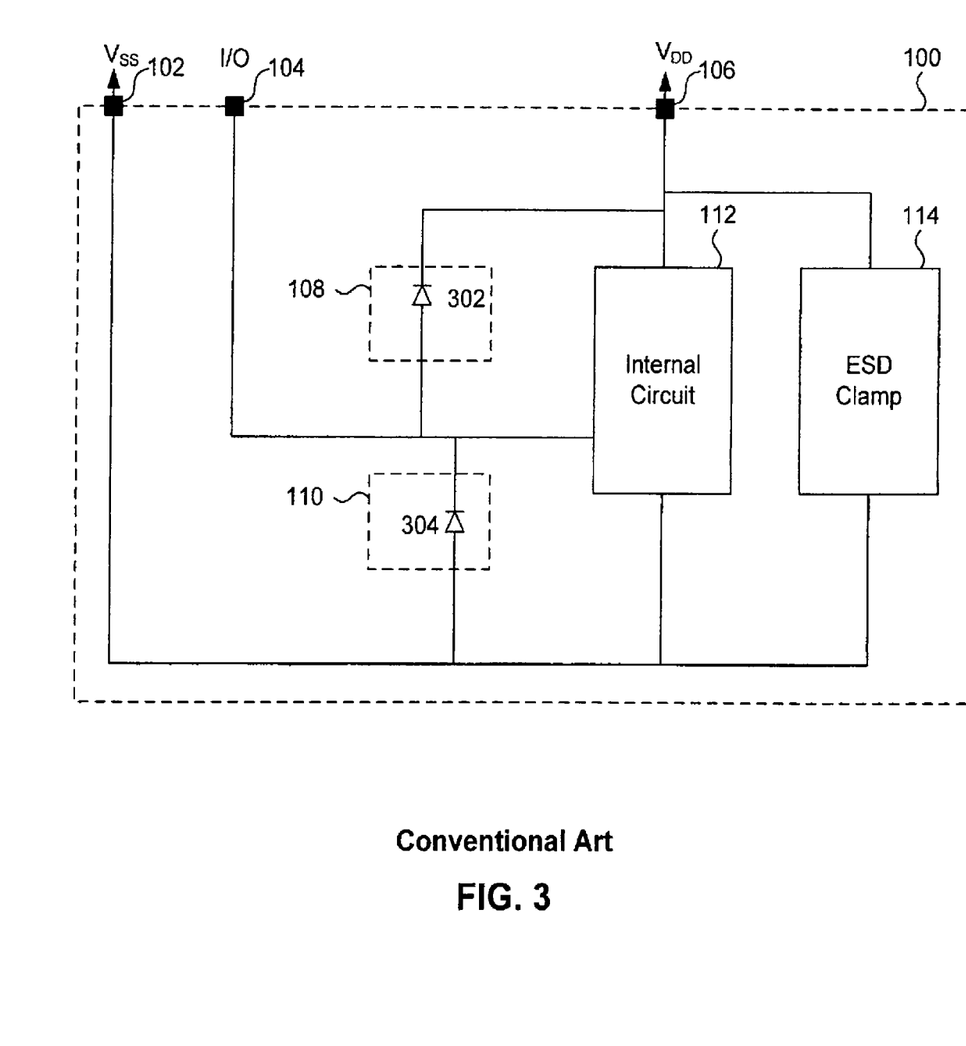
FIG. 3 illustrates a conventional implementation of ESD protection circuits depicted in FIG. 1.

FIG. 3 illustrates a conventional implementation of the ESD protection circuit 108 and the ESD protection circuit 110 of the integrated circuit 100. The ESD protection circuit 108 includes a diode 302. The anode of the diode 302 is connected between the I/O pad 104 and the internal circuit 112. The cathode of the diode 302 is connected between the internal circuit 112 and the $V_{DD}$ pad 106. The diode 302 is reverse biased when the cathode of the diode 302 is at a higher voltage potential than the anode of the diode 302. The supply voltage $V_{DD}$ is at a higher voltage potential than the voltage appearing at the I/O pad 104 during normal operation of the integrated circuit 100. Therefore, the diode 302 is reverse biased during normal operation of the integrated circuit 100. The diode 302 appears as a high impedance element (i.e., an open circuit) when the diode 302 is reverse biased.

The diode 302 is forward biased when the anode of the diode 302 is at a higher voltage potential than the cathode of the diode 302. The diode 302 appears as a low impedance element (i.e., a short circuit) when the diode 302 is forward biased. The diode 302 will be forward biased during a positive ESD event. The ESD discharge applied to the I/O pad 104 during a positive ESD event is shunted by the diode 302 to the ESD clamp 114, and on to $V_{SS}$, to protect the internal circuit 112 from damage.

As further shown in FIG. 3, the ESD protection circuit 110 includes a diode 304. The anode of the diode 304 is connected to the $V_{SS}$ pad 102. The cathode of the diode 304 is connected between the internal circuit 112 and the I/O pad 104, at the anode of the diode 302. The diode 304 is reverse biased when the anode of the diode 304 is at a lower voltage potential than the cathode of the diode 304. $V_{SS}$ is at a lower voltage potential than the voltage appearing at the I/O pad 104 during normal operation of the integrated circuit 100. Therefore, the diode 304 is reverse biased during normal operation of the integrated circuit 100. The diode 304 appears as a high impedance element (i.e., an open circuit) when the diode 304 is reverse biased.

The diode 304 is forward biased when the cathode of the diode 304 is at a lower voltage potential than the anode of the diode 304. The diode 304 appears as a low impedance element (i.e., a short circuit) when the diode 304 is forward biased. The diode 304 will be forward biased during a negative ESD event. The ESD discharge applied to the I/O pad 104 during a negative ESD event is shunted by the diode 304 to the $V_{SS}$ pad 106 to protect the internal circuit 112 from damage. The diodes 302 and 304 can be implemented by a variety of technologies, including Complementary Metal Oxide Semiconductor (CMOS) technology.

The bandwidth and linearity of the I/O signals can be degraded by a parasitic loading on the I/O pad 104. Parasitic capacitances of the diode 302 and the diode 304 contribute to the parasitic loading on the I/O pad 104. The parasitic capacitances of the diode 302 and the diode 304 can reduce I/O signal bandwidth and linearity. The desire to increase I/O signal bandwidth and quality drives the need to minimize the parasitic loading effect introduced by the diode 302 and the diode 304 on the I/O pad 104.

Figure 4:
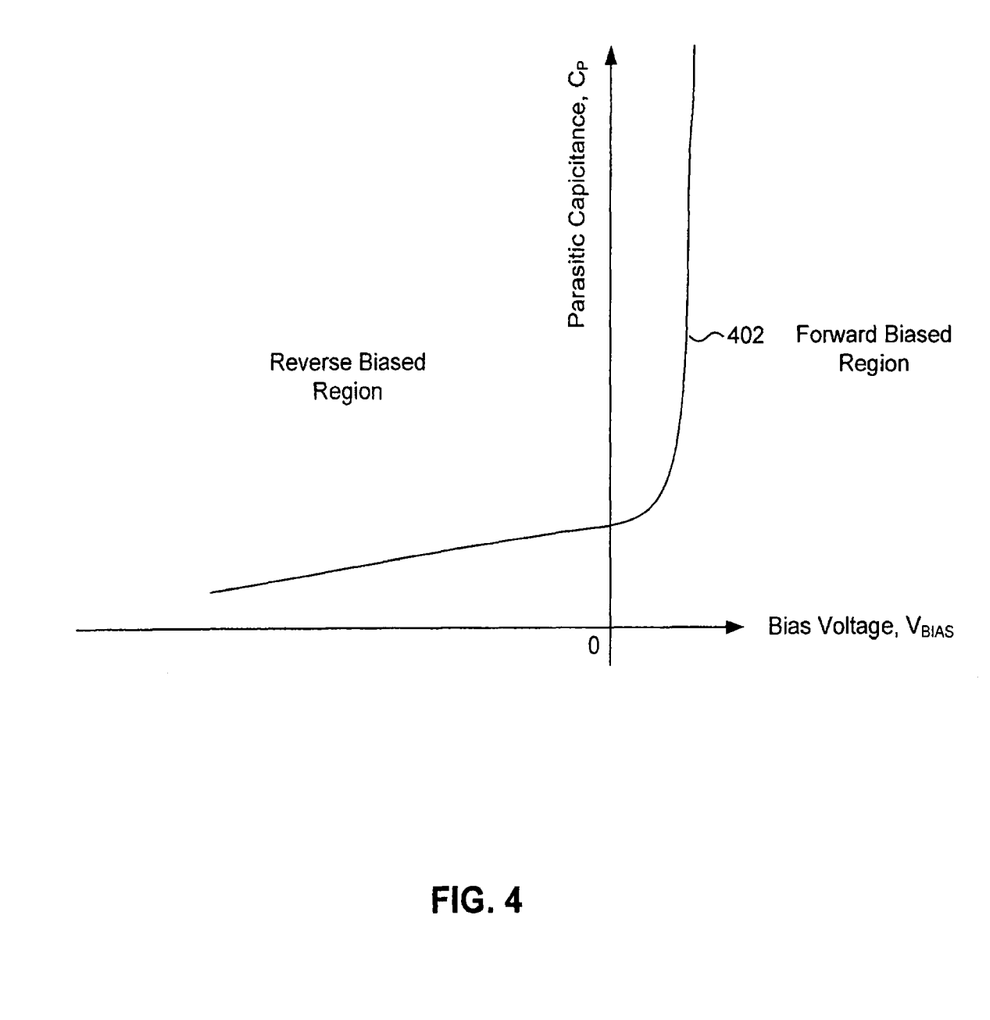
FIG. 4 illustrates a general relationship between a parasitic capacitance of a diode and a bias voltage of the diode.

The parasitic capacitances of the diode 302 and the diode 304 are attributable to a p-n junction capacitor intrinsic to the diode 302 and the diode 304. FIG. 4 illustrates a general relationship between the parasitic capacitance ($C_P$) of a diode and the bias voltage ($V_{BIAS}$) applied across the terminals (i.e., the anode and cathode) of the diode. As shown in FIG. 4 by a curve 402, $C_P$ is non-linear and dependent on $V_{BIAS}$. FIG. 4 shows that $C_P$ decreases and becomes more linear as the reverse bias voltage across the diode increases. Every diode can be approximately characterized by the curve 402, though the exact composition of a particular diode can affect the specific dependency of $C_P$ to $V_{BIAS}$. For example, $C_P$ will increase for a given $V_{BIAS}$ as the diode size is increased.

The diode operates in a forward biased region when $V_{BIAS} > V_{DIODE}$, where $V_{DIODE}$ represents the turn-on voltage of the diode (e.g., the $V_{DIODE}$ is approximately equal to 0.7 V). In the forward biased region, the anode of the diode is always at a higher voltage potential than the cathode of the diode. The ideal diode is modeled as a short circuit when operating in the forward biased region. The diode operates in a reverse biased region when $V_{BIAS} < V_{DIODE}$. In the reverse biased region, the anode of the diode is sometimes at a lower voltage potential than the cathode of the diode. For $V_{BIAS} < 0V$, the anode of the diode is always at a lower voltage potential than the cathode of the diode. The idea diode is modeled as an open circuit when operating in the forward biased region.

The relationship between $C_P$ and $V_{BIAS}$ displayed by the curve 402 shows that the parasitic capacitances of the diode 302 and the diode 304 is reduced when the diode 302 and the diode 304 are reverse biased. Consequently, the parasitic loading effect at the I/O pad 104 caused by the parasitic capacitances of the diode 302 and the diode 304 decreases as the reverse bias voltage applied across the diode 302 and the diode 304 increases. Interference to I/O signal quality and bandwidth can therefore be minimized so long as the signal swing at the I/O pad 104 does not force either the diode 302 or the diode 304 to operate in the forward bias region.

As mentioned above, the parasitic capacitances of the diode 302 and the diode 304 are proportional to their sizes. The parasitic loading effect of the diode 302 and the diode 304 is minimized by decreasing the size of the diode 302 and the diode 304. The ESD protection capabilities of the diode 302 and the diode 304, however, are also proportional to their sizes. Therefore, decreasing the sizes of the diode 302 and the diode 304 decreases the ESD protection provided by the diode 302 and the diode 304.

Figure 5:
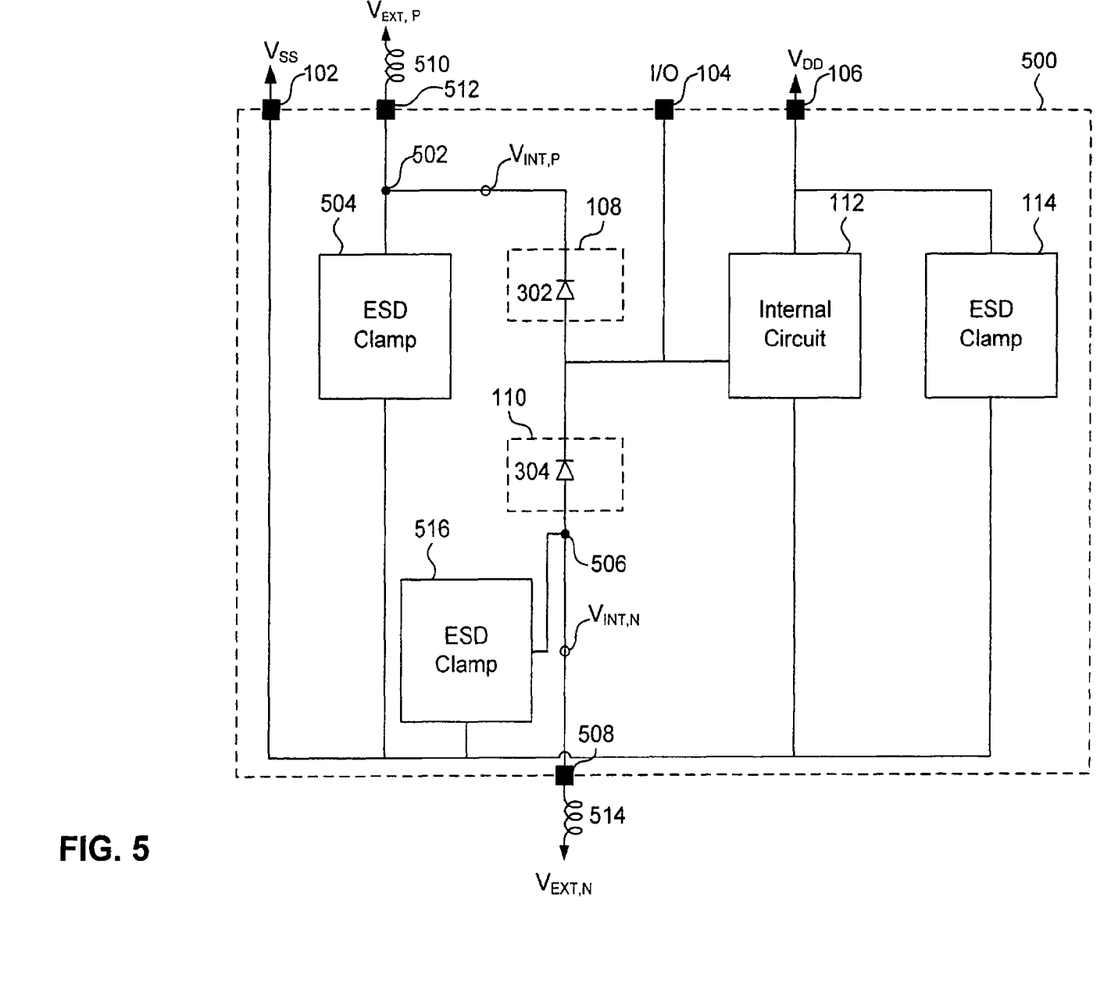
FIG. 5 illustrates an integrated circuit having an I/O ESD configuration of the invention that reduces I/O signal non-linearity and increases I/O signal bandwidth without sacrificing ESD protection.

FIG. 5 illustrates an integrated circuit 500 with an I/O ESD configuration that reduces I/O signal non-linearity and increases I/O signal bandwidth without sacrificing ESD protection, according to embodiments of the present invention. The integrated circuit 500 accommodates high quality, high bandwidth I/O signals and provides I/O ESD protection without the need to decrease the sizes of the diode 302 and the diode 304. The integrated circuit 500 reduces the effect of the parasitic capacitances of the ESD protection circuits 108 and 110, provided the capacitance of each is contributed by a reverse biased diode 302 and a reverse biased diode 304.

As shown in FIG. 5, the anode of the diode 302 is connected between the I/O pad 104 and the internal circuit 112. The cathode of the diode 302 is connected between an external pad 512 and an ESD clamp 504 at a node 502. The external pad 512 is connected to an inductor 510. The inductor 510 is connected to a supply voltage $V_{EXT,P}$, which is a relatively high, positive voltage supply that is external to the integrated circuit 500. The supply voltage $V_{EXT,P}$ provides a higher positive voltage than the voltage provided by the supply voltage $V_{DD}$. As a result, a high, DC reverse bias voltage is applied across the diode 302 using a positive internal supply line $V_{INT,P}$.

The reverse bias voltage applied across the diode 302 shown in FIG. 5 can be greater than a reverse bias voltage applied across the diode 302 shown in FIG. 3. The supply voltage $V_{EXT,P}$ allows the diode 302 to operate deeper within the reverse biased region. Consequently, the parasitic capacitance of the diode 302 is reduced. The diode 302 also operates within a smaller range of non-linearity, therefore causing less modulated distortion to the I/O signal applied to the I/O pad 104.

The diode 302 in integrated circuit 500 will remain reverse biased over a greater range of I/O signals than the diode 302 of integrated circuit 300. Specifically, the diode 302 in integrated circuit 300 can remain reverse biased provided the voltage of the I/O signal applied to the I/O pad 104 is not higher than the supply voltage $V_{DD}$. The diode 302 in integrated circuit 500, however, will remain reverse biased provided the voltage of the I/O signal applied to the I/O pad 104 is not higher than the supply voltage $V_{EXT,P}$, which can be higher than the supply voltage $V_{DD}$. Further, the parasitic capacitance of the diode 302 is lower per FIG. 4.

As further shown in FIG. 5, the cathode of the diode 304 is connected between the I/O pad 104 and the internal circuit 112, at the anode of the diode 302. The anode of the diode 304 is connected to an external pad 508 and to an ESD clamp 516 at a node 506. The external pad 508 is connected to an inductor 514. The inductor 514 is connected to a supply voltage $V_{EXT,N}$, which is a relatively high, negative voltage supply that is external to the integrated circuit 500. The supply voltage $V_{EXT,N}$ provides a higher negative voltage than the voltage provided by the supply voltage $V_{SS}$. As a result, a high, DC reverse bias voltage is applied across the diode 304 using a negative internal supply line $V_{INT,P}$.

The reverse bias voltage applied across the diode 304 shown in FIG. 5 can be greater than a reverse bias voltage applied across the diode 304 shown in FIG. 3. The supply voltage $V_{EXT,N}$ allows the diode 304 to operate deeper within the reverse biased region. Consequently, the parasitic capacitance of the diode 304 is reduced. The diode 304 also operates within a smaller range of non-linearity, therefore causing less modulated distortion to an I/O signal applied to the I/O pad 104. Further, the diode 304 in integrated circuit 500 can remain reverse biased over a greater range of I/O signals than the diode 304 of integrated circuit 300. Specifically, the diode 304 in integrated circuit 300 will remain reverse biased provided the I/O signal applied to I/O pad is not lower than the supply voltage $V_{SS}$. The diode 304 in integrated circuit 500, however, will remain reverse biased provided the voltage of the I/O signal applied to I/O pad is not below the supply voltage $V_{EXT,N}$, which can be lower than the supply voltage $V_{SS}$. Further, the parasitic capacitance of the diode 304 is lower per FIG. 4.

The inductor 510 appears as a low impedance element (i.e., a short circuit) at low frequencies. The inductor 510 therefore does not block the DC voltage provided by the supply voltage $V_{EXT,P}$ from being applied to the cathode of the diode 302. The inductor 510, however, appears as a high impedance element (i.e., an open circuit) at high frequencies. As a result, the node 502 is electrically floating in AC, or at high frequencies, since the inductor 510 blocks high frequency voltages between the I/O pad 104 and the supply voltage $V_{EXT,P}$. The effect of the parasitic capacitance of the diode 302 is diminished at high frequencies because the charging and discharging of the parasitic capacitance is reduced. In turn, I/O signal modulation can be minimized or lowered over a frequency band corresponding to the frequencies of the desired I/O signals applied to input pad 104.

The inductor 514 behaves similarly to the inductor 510. Specifically, the inductor 514 also appears as a low impedance element (i.e., a short circuit) at low frequencies. The inductor 514 therefore does not block the DC voltage provided by the supply voltage $V_{EXT,N}$ from being applied to the cathode of the diode 304. The inductor 514, however, appears as a high impedance element (i.e., an open circuit) at high frequencies. As a result, the node 506 is electrically floating in AC, or at high frequencies, since the inductor 514 blocks high frequency voltages between the I/O pad 104 and the supply voltage $V_{EXT,N}$. The effect of the parasitic capacitance of the diode 304 is diminished at high frequencies because the charging and discharging of the parasitic capacitance is reduced. In turn, I/O signal modulation caused by the parasitic capacitance of the diode 304 is minimized.

The ESD clamp 504 is a device that shunts ESD discharge current when triggered by an ESD event. The ESD clamp 504 clamps the node 502 to $V_{SS}$ during a positive ESD event. The diode 302 is forward biased during a positive ESD event. An ESD current applied to the I/O pad 104 is shunted through the diode 302 and through the ESD clamp 504 to $V_{SS}$.

The ESD clamp 516 operates in a similar manner as the ESD clamp 504. Specifically, The ESD clamp 516 shunts ESD discharge current when triggered by an ESD event. The ESD clamp 516 clamps the node 506 to $V_{SS}$ during a negative ESD event. The diode 302 is forward biased during a negative ESD event. An ESD current applied to the I/O pad 104 is shunted through the diode 304 and through the ESD clamp 516 to $V_{SS}$.

The ESD clamp 504 and the ESD clamp 516 can be designed to react to both high and low frequency ESD events. The triggering voltages of the ESD clamps 504 and 506 can also be configured to exceed the normal I/O operating voltages of the integrated circuit 500. In this way, the ESD clamps 504 and 516 can be configured to react only to ESD events and not to an I/O signal that temporarily forward biases either the diode 302 or the diode 304.

The ESD clamps 504 and 516 each have an associated parasitic capacitance. The inductor 510 and the inductor 514 can be used to tune out the parasitic loading effect due to the ESD clamps 504 and 516, respectively. The ability to tune out the parasitic loading effect of the ESD clamps 504 and 516 can be useful, for example, in applications using narrowband I/O signals. The tuned circuit comprising the ESD clamp 504 and the inductor 510 is governed by the equation:

$$\omega^2 = \frac{1}{L_{510}C_{504}},$$

where $\omega$ is the angular frequency of the frequency band of interest, $L_{510}$ is the inductance value of the inductor 510, and $C_{504}$ is load capacitance of the ESD clamp 504 appearing at node 502. Similarly, the tuned circuit comprising the ESD clamp 516 and the inductor 514 is governed by the equation:

$$\omega^2 = \frac{1}{L_{514}C_{516}},$$

where $\omega$ is again the angular frequency of the frequency band of interest, $L_{514}$ is the inductance value of the inductor 514, and $C_{516}$ is load capacitance of the ESD clamp 516 appearing at node 506.

It is possible to implement the inductors 510 and 514 in a number of ways. For example, the inductors 510 and 514 can be discrete components external to the integrated circuit 500. Inductors 510 and 514 can also be package components residing inside the integrated circuit package. Alternatively, the inductors 510 and 514 can be parasitic package inductances that exists in the integrated circuit package. Further, the inductors 510 and 514 can be integrated inductors built within the integrated circuit 500. It is also possible to implement each inductor 510 and 514 by combining a variety of the aforementioned inductive elements.

The integrated circuit 500 reduces the parasitic capacitance on the I/O pad 104 attributed to the ESD protection circuits 108 and 110. The integrated circuit 500 reduces the parasitic loading effect of the ESD protection circuit 108 by providing the positive internal supply line $V_{INT,P}$ that highly reverse biases the diode 302 in DC, and is electrically floating in AC, as indicated by the curve 402 in FIG. 4. The integrated circuit 500 reduces the parasitic loading effect of the ESD protection circuit 110 by providing the negative internal supply line $V_{INT,N}$ that highly reverse biases the diode 304 in DC, and is electrically floating in AC.

The positive internal supply line $V_{INT,P}$ allows the integrated circuit 500 to control the bias voltage asserted across the p-n junction of the diode 302 by introducing the inductor 510 to one side of the diode 302. Similarly, the negative internal supply line $V_{INT,N}$ allows the integrated circuit 500 to control the bias voltage asserted across the p-n junction of the diode 304 by introducing the inductor 514 to one side of the diode 304. The inductors 510 and 514 can also provide impedance tuning capability. The inductors 510 and 514 do not block off ESD protection circuit components from the I/O signal path within the high frequency domain to protect against ESD discharge that can occupy all frequency bands. Overall, the I/O ESD protection configuration of the integrated circuit 500 can increase I/O signal bandwidth and reduce I/O signal non-linearity without sacrificing ESD protection.

Figure 6:
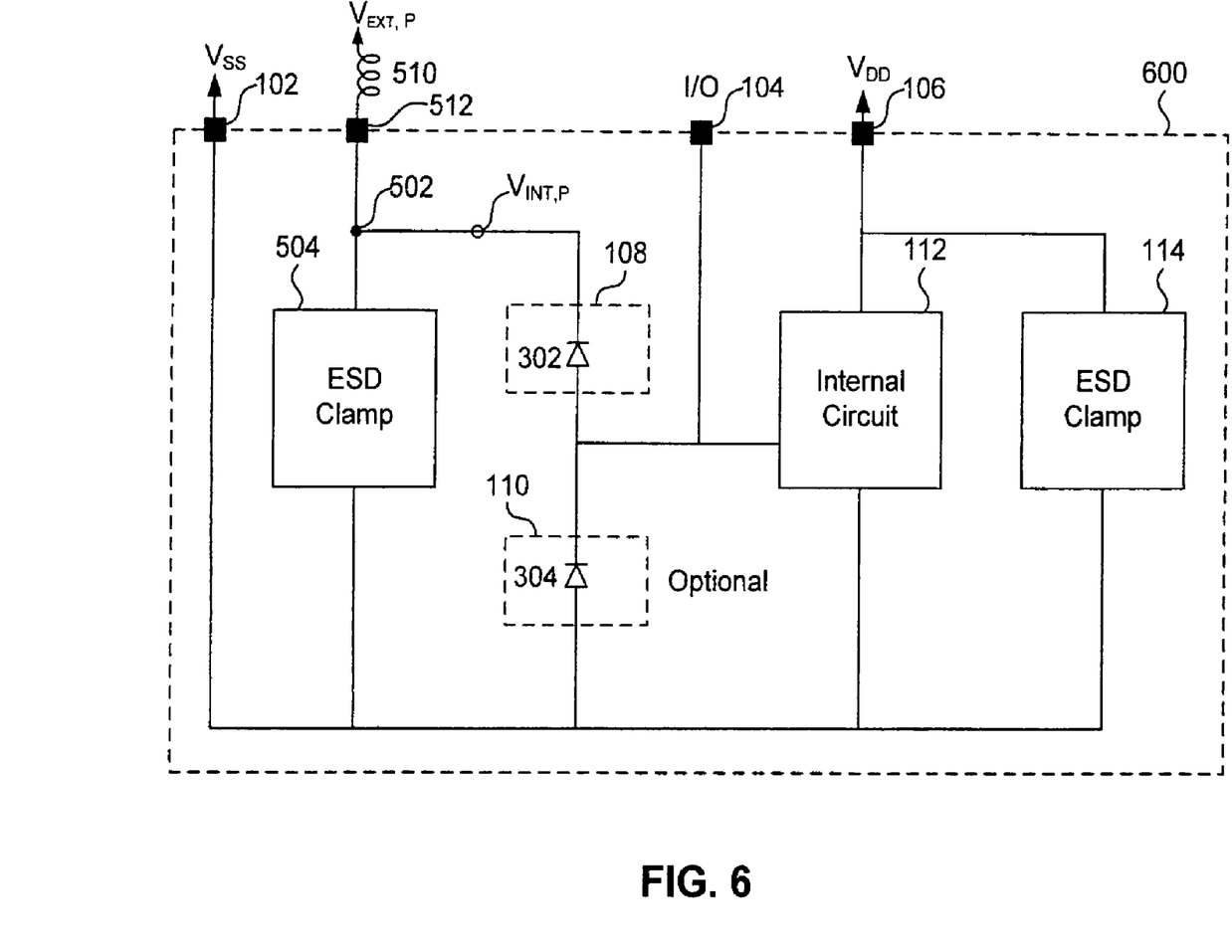
FIG. 6 illustrates an alternative arrangement of the I/O ESD configuration of the invention depicted in FIG. 5.

FIG. 6 illustrates an integrated circuit 600 having an alternative configuration of the I/O ESD protection configuration depicted in FIG. 5. As shown in FIG. 6, the ESD protection circuit 110 is optional. The I/O ESD configuration of integrated circuit 600 can be used, for example, when the diodes 302 and 304 are implemented using CMOS technology. The anodes of some diodes implemented with CMOS technology cannot be driven below $V_{SS}$, thereby rendering a negative power supply superfluous. Alternatively, the I/O ESD configuration of integrated circuit 600 can be used when it is prohibitively expensive to build a system level board for an integrated circuit that provides a voltage lower than ground (i.e., $V_{SS}$). Under either scenario, it is possible to eliminate the diode 304 (i.e., the ESD protection circuit 110) to remove the parasitic capacitance due to the diode 304, and to instead rely on the internal circuit 112. Specifically, circuitry within the internal circuit 112 can be designed to provide for the ESD discharge path that the diode 304 would otherwise provide. The I/O ESD protection provided by the integrated circuit 600 can therefore be complete even when the ESD protection circuit 110 is absent.

Figure 7:
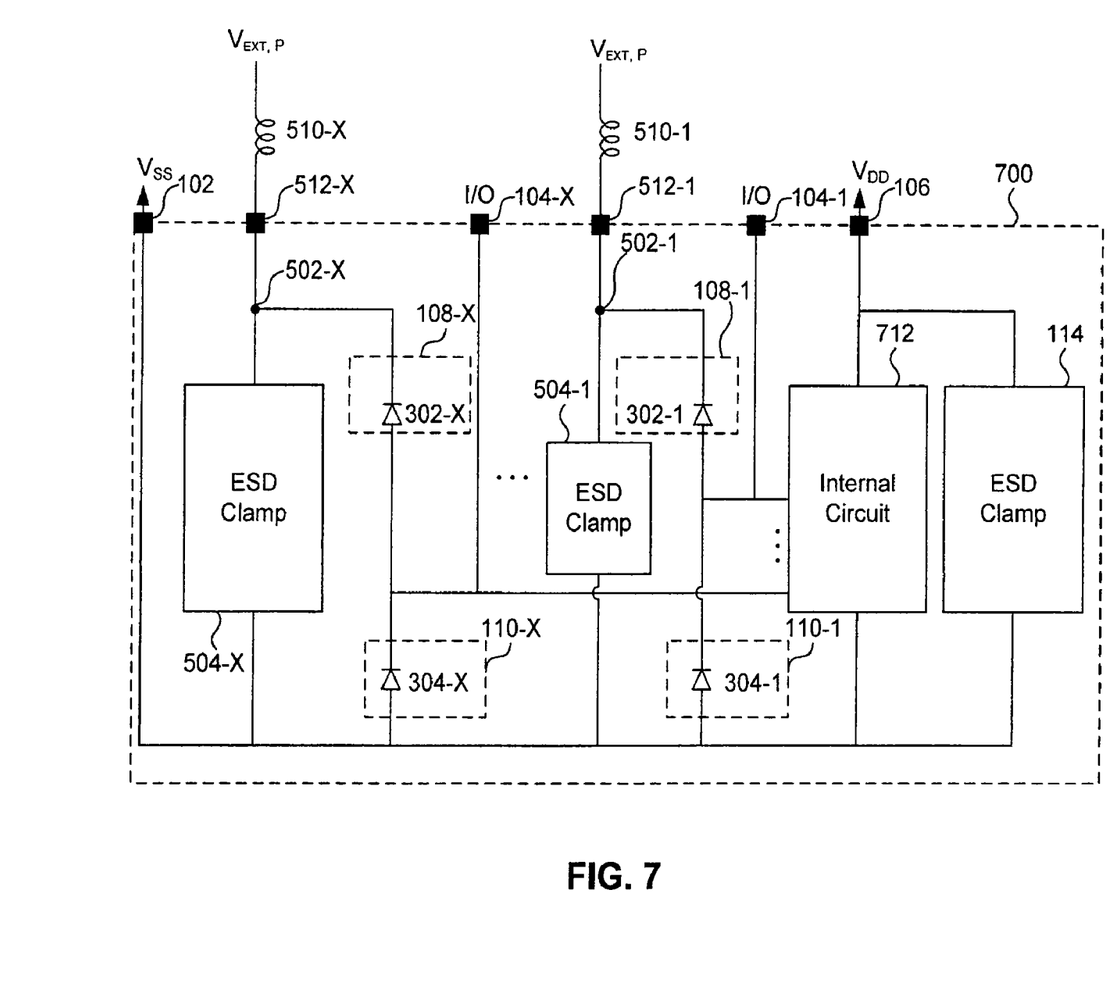
FIG. 7 illustrates an alternative arrangement of the I/O ESD configuration of the invention depicted in FIG. 6 for an integrated circuit with multiple I/O ports connected to a single internal circuit.
Figure 8:
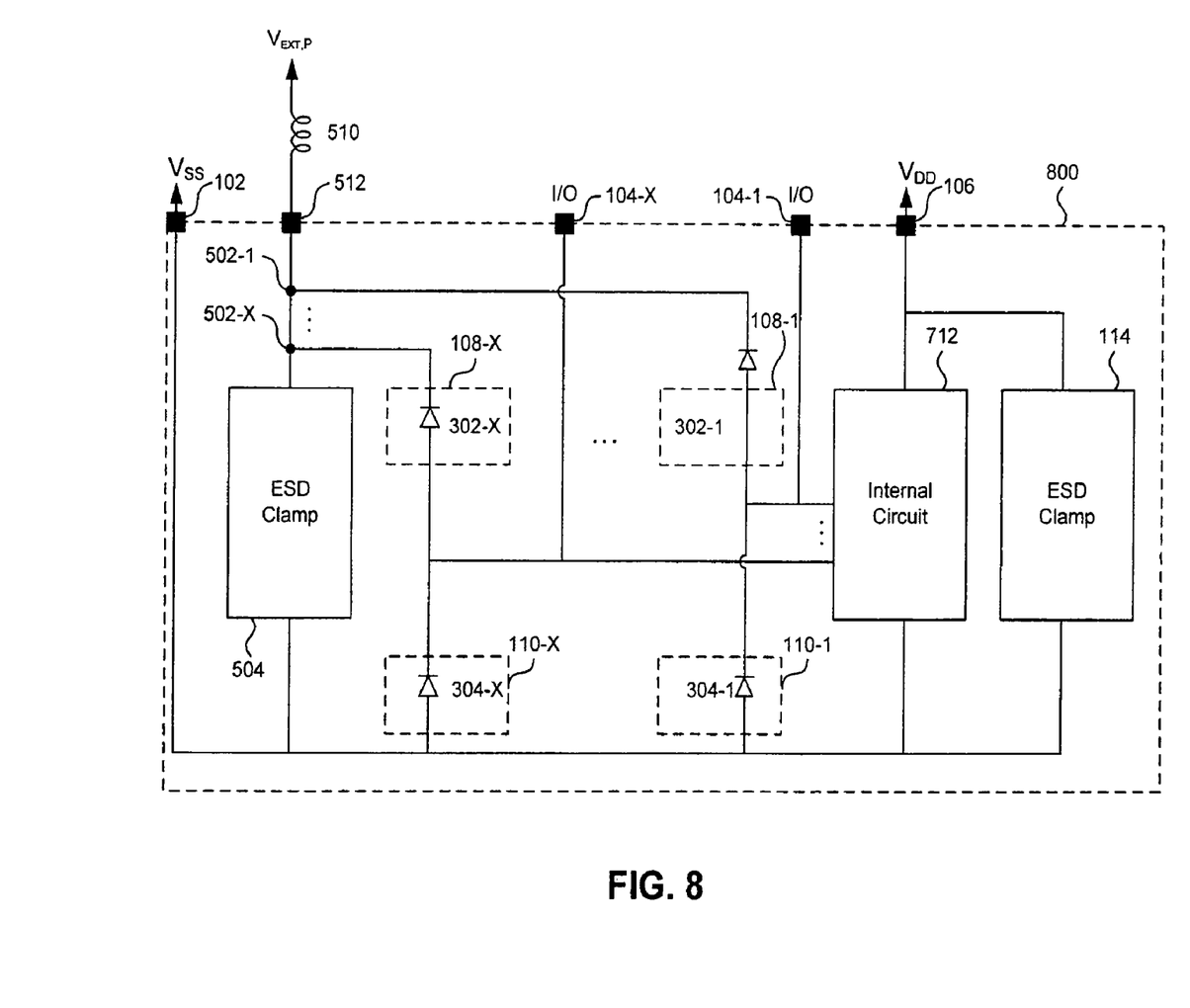
FIG. 8 illustrates another alternative arrangement of the I/O ESD configuration of the invention depicted in FIG. 6 for an integrated circuit with multiple I/O ports connected to a single internal circuit.
Figure 9:
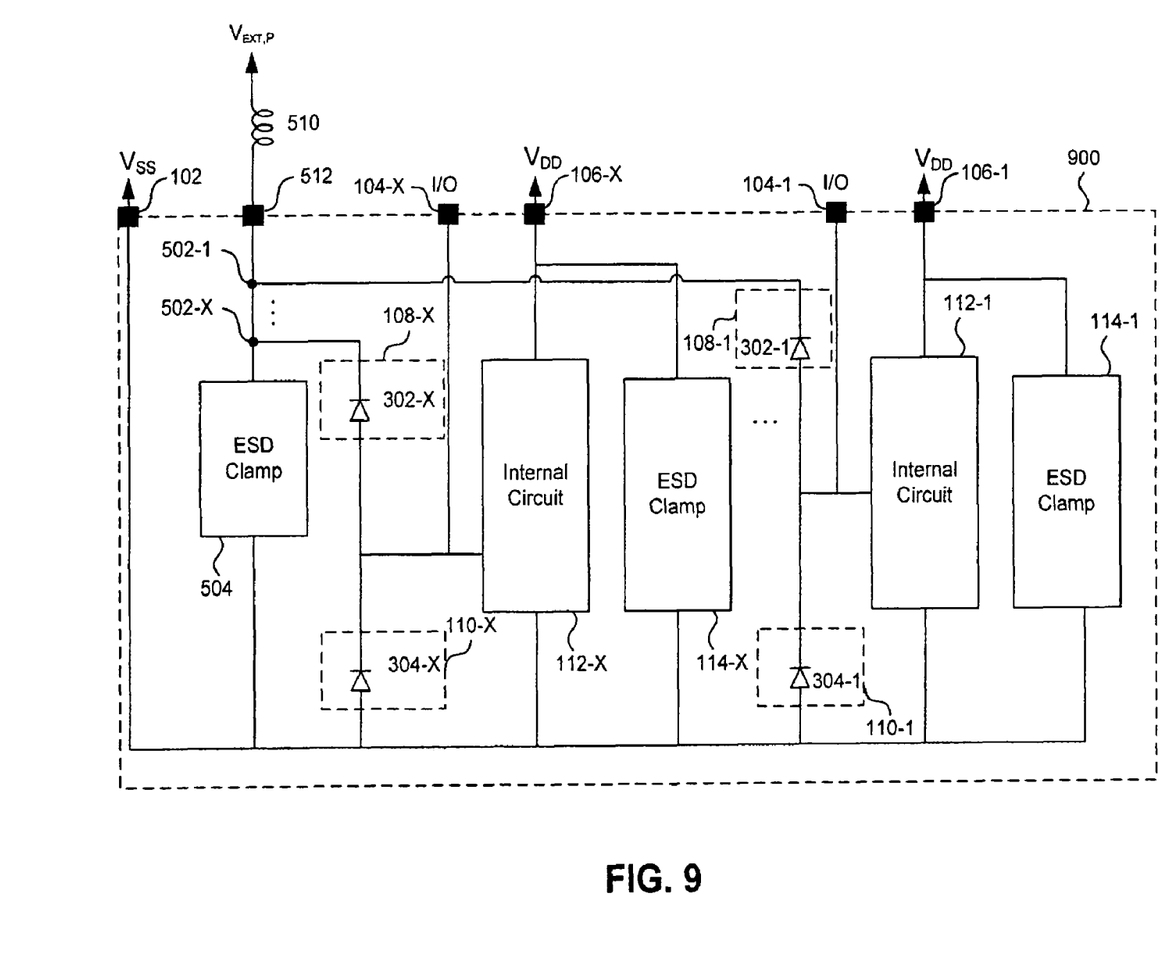
FIG. 9 illustrates an alternative arrangement of the I/O ESD configuration of the invention depicted in FIG. 6 for an integrated circuit with multiple I/O ports connected to multiple internal circuits.

FIGS. 7-9 illustrate an expansion of the I/O ESD depicted in FIG. 6 to accommodate multiple I/O ports. FIG. 7 illustrates an integrated circuit 700 having a number of I/O pads 104-1 through 104-X connected to an internal circuit 712. The internal circuit 712 is designed to handle multiple independent I/O signals. The ESD configuration of each I/O pad 104-1 through 104-X is accommodated by individual inductors 510-1 through 510-X connected to the integrated circuit 700 at corresponding external pads 512-1 through 512-X. Each I/O pad 104-1 through 104-X is support by ESD protection circuits 108-1 through 108-X, each containing diodes 302-1 through 302-X, respectively. The ESD protection circuits 108-1 through 108-X are connected to ESD clamps 504-1 through 504-X, respectively, at corresponding nodes 502-1 through 502-X. The ESD protection circuits 110-1 through 110-X, each containing diodes 304-1 through 304-X, respectively, are optional.

FIG. 8 illustrates an integrated circuit 800 with multiple I/O pads 104-1 through 104-X that share a common inductor 510 and a common ESD clamp 504. FIG. 9 illustrates an integrated circuit 900 with multiple I/O pads 104-1 through 104-X that are connected to individual internal circuits 112-1 through 112-X. The multiple I/O pads 104-1 through 104-X also share a common inductor 510 and a common ESD clamp 504. The ESD protection circuits 110-1 through 110-X depicted in FIGS. 8 and 9 can be made optional in accordance with the description provided above.

The present invention is described herein with reference to a single $V_{SS}$ discharge system for clarity only. The present invention is therefore not limited to using a single $V_{SS}$ discharge system. Accordingly, the present invention can be expanded and integrated into an ESD system using multiple $V_{SS}$ discharge systems, as will be understood by those skilled in the relevant art.

Figure 10:
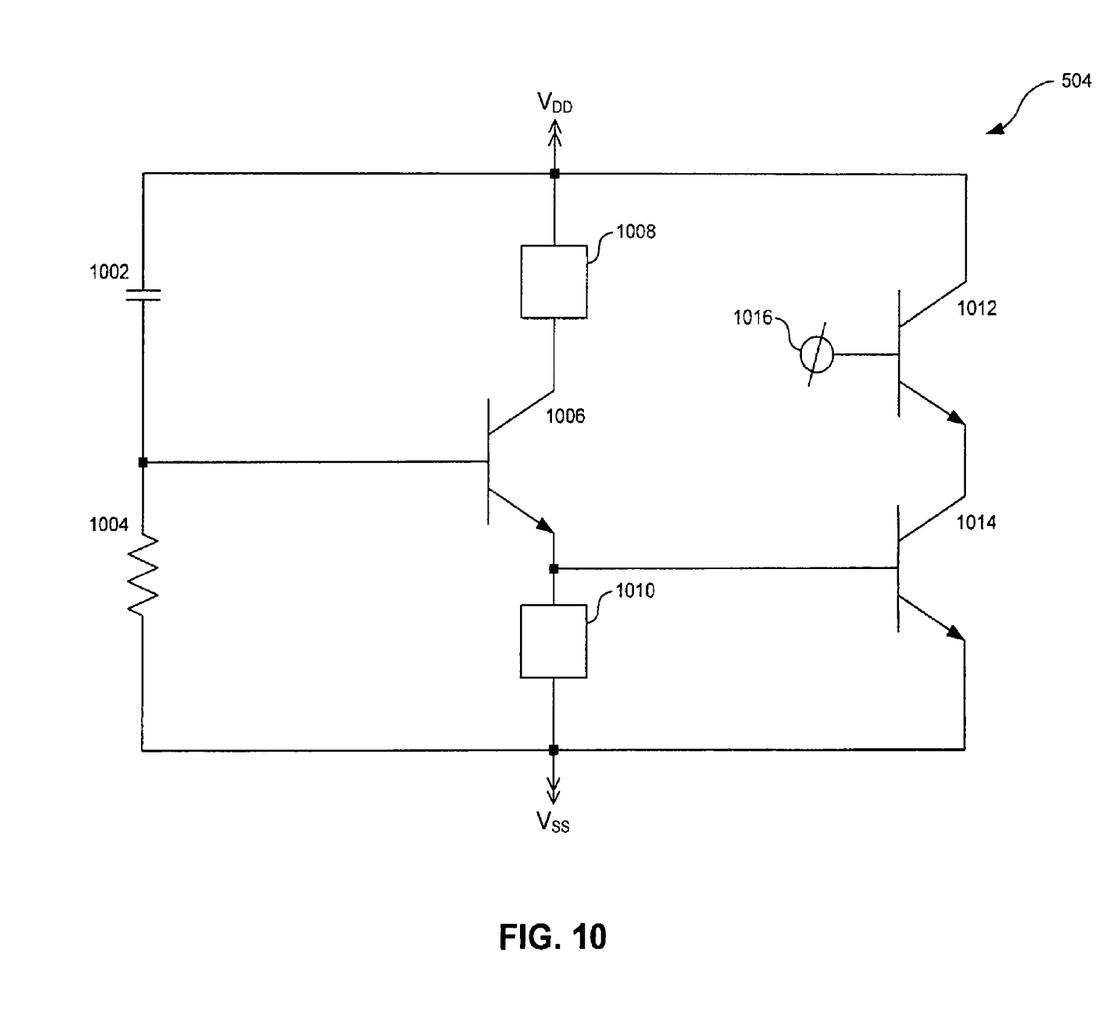
FIG. 10 illustrates an ESD clamp of the integrated circuit depicted in FIG. 5.

The ESD clamps 504 and 516 can be configured similarly to the ESD clamp 114 depicted in FIG. 1. Alternatively, the ESD clamps 504 and 516 can be configured as a cascaded bipolar structure having a pre-driver stage in a Darlington configuration. FIG. 10 illustrates an alternative configuration of the ESD clamp 504 according to the present invention. As shown in FIG. 10, the ESD clamp 504 includes a capacitor 1002 and a resistor 1004. The capacitor 1002 can be a MOS capacitor. The capacitor 1002 provides ESD event sensing and is used in conjunction with the resistor 1004 for RC timing or triggering of the ESD clamp 504.

As further shown in FIG. 10, the ESD clamp 504 further includes a transistor 1006. Circuit elements 1008 and 1010 provide biasing for the transistor 1006. The ESD clamp also includes a transistor 1012 and a transistor 1014. The transistor 1012 includes biasing control 1016. The transistors 1012 and 1014 are arranged in a cascade configuration while the transistors 1006 and 1014 are arranged in a Darlington configuration. The ESD clamp 504 can be connected between the supply voltages $V_{SS}$ and $V_{DD}$.

As previously mentioned, the ESD clamp 516 can be configured in a manner similar to the configuration of the ESD clamp 504 as depicted in FIG. 10. Further, the configuration of the ESD clamp 114 can follow the configuration of the ESD clamp 504. As will be appreciated by a person having ordinary skill in the relevant arts from the discussion herein, the configuration of the ESD clamps 114, 504 and 516 can be adjusted to provide a desired clamping function for a given input signal and to provide a shunting path from one or more inputs to one or more outputs, as may be required by the location of a particular clamp in an integrated circuit.

CONCLUSION

While various embodiments of the present invention have been described above, it should be understood that they have been presented by way of example and not limitation. It will be apparent to one skilled in the pertinent art that various changes in form and detail can be made therein without departing from the spirit and scope of the invention. Therefore, the present invention should only be defined in accordance with the following claims and their equivalents.

What is claimed is:

1. An integrated circuit comprising:
an input/output (I/O) pad;
an internal circuit biased with a first voltage supply and a second voltage supply, wherein the internal circuit is connected to the I/O pad at a first node;
an electrostatic discharge (ESD) protection circuit connected between the first node and a second node; and
an inductor connected between the second node and a third voltage supply.

2. The integrated circuit of claim 1, further comprising an ESD clamp connected between the second node and the second voltage supply.

3. The integrated circuit of claim 2, wherein the ESD clamp is configured to shunt ESD current from the ESD protection circuit during a positive I/O ESD event.

4. The integrated circuit of claim 3, further comprising:
a second ESD protection circuit coupled between the first node and a fourth voltage supply; and
a second ESD clamp configured to shunt ESD current from the second ESD protection circuit during a negative I/O ESD event.

5. The integrated circuit of claim 1, wherein:
the first voltage supply comprises a first positive voltage;
the second voltage supply comprises ground; and
the third voltage supply comprises a second positive voltage, wherein the second positive voltage is greater than the first positive voltage.

6. The integrated circuit of claim 1, wherein the third voltage supply is configured to provide a reverse bias voltage across the ESD protection circuit to reduce a parasitic capacitance.

7. The integrated circuit of claim 1, wherein the inductor is configured to transfer voltage from the third voltage supply to the second node in a first frequency range and to block voltage from third voltage supply to the second node in a second frequency range.

8. The integrated circuit of claim 7, wherein the inductor is configured to have a relatively low impedance when a signal with a relatively low frequency is present on the I/O pad and to have a relatively high impedance when a signal with a relatively high frequency is present on the I/O pad.

9. The integrated circuit of claim 1, wherein the inductor comprises at least one of a discrete component external to the integrated circuit, a discrete component internal to the integrated package, and a package component internal to the integrated circuit.

10. The integrated circuit of claim 1, further comprising an ESD clamp connected between the first voltage supply and the second voltage supply.

11. The integrated circuit of claim 1, further comprising:
a second I/O pad, wherein the internal circuit is connected to the second I/O pad at a third node;

a second ESD protection circuit connected between the third node and a fourth node; and a second inductor connected between the fourth node and the third voltage supply.

12. The integrated circuit of claim 11, further comprising:

a first ESD clamp connected between the first voltage supply and the second voltage supply;

a second ESD clamp connected between the second node and the second voltage supply; and a third ESD clamp connected between the fourth node and the second voltage supply.

13. The integrated circuit of claim 12, further comprising:

a third ESD protection circuit coupled between the first node and the second voltage supply; and a fourth ESD protection circuit coupled between the third node and the second voltage supply.

14. The integrated circuit of claim 1, further comprising:

a second I/O pad, wherein the internal circuit is connected to the second I/O pad at a third node; and a second ESD protection circuit connected between the second node and the third node.

15. The integrated circuit of claim 14, further comprising:

a first ESD clamp connected between the first voltage supply and the second voltage supply; and a second ESD clamp connected between the second node and the second voltage supply.

16. The integrated circuit of claim 1, further comprising:

a second internal circuit connected between the first voltage supply and the second voltage supply;

a second I/O pad, wherein the second internal circuit is connected to the second I/O pad at a third node; and a second ESD protection circuit connected between the second node and the third node.

17. A method for protecting an integrated circuit from electrostatic discharge (ESD), the integrated circuit coupled to a first voltage supply, a second voltage supply, and an input-output (I/O) pad, the method comprising:

reverse biasing an ESD protection circuit that is connected to the I/O pad and the integrated circuit at a first node and coupled to a third voltage supply through an inductor at a second node;

discharging an ESD current present on the I/O pad through the ESD protection circuit; and transferring the ESD current from the ESD protection circuit to an ESD clamp, wherein the ESD clamp transfers the ESD current away from the third voltage supply.

18. The method of claim 17, wherein the step of reverse biasing the ESD protection circuit reduces the parasitic capacitance of the ESD protection circuit.

19. The method of claim 17, wherein the step of reverse biasing the ESD protection circuit comprises tuning the inductor to have a relatively low impedance when a signal with a relatively low frequency is present on the I/O pad.

20. The method of claim 17, wherein the step of reverse biasing the ESD protection circuit comprises tuning the inductor to have a relatively high impedance when a signal with a relatively high frequency is present on the I/O pad.

* * * * *